(12) United States Patent
Kim et al.

(10) Patent No.: US 7,787,771 B2
(45) Date of Patent: Aug. 31, 2010

(54) EXTENDABLE LOOP-BACK TYPE PASSIVE OPTICAL NETWORK AND SCHEDULING METHOD AND APPARATUS FOR THE SAME

(75) Inventors: Tae Yeon Kim, Daejeon (KR); Jeong Ju Yoo, Daejeon (KR); Kang Bok Lee, Daejeon (KR); Hyeon Ho Yoon, Daejeon (KR); Byoung Whi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 642 days.

(21) Appl. No.: 11/636,131

(22) Filed: Dec. 8, 2006

(65) Prior Publication Data

US 2007/0154217 A1    Jul. 5, 2007

(30) Foreign Application Priority Data

Dec. 8, 2005    (KR) .................... 10-2005-0119992
Dec. 4, 2006    (KR) .................... 10-2006-0121814

(51) Int. Cl.
*H04J 14/00*    (2006.01)
*H04J 3/16*    (2006.01)

(52) U.S. Cl. ............................. 398/68; 398/66; 398/43; 370/468

(58) Field of Classification Search .................. 398/68, 398/66, 43; 370/468
See application file for complete search history.

(56) References Cited

U.S. PATENT DOCUMENTS

2005/0047784 A1*    3/2005    Jung et al. .................... 398/72

FOREIGN PATENT DOCUMENTS

KR    10-2004-0056828    7/2004
KR    1020040070477    8/2004

OTHER PUBLICATIONS

Kim ["Design and Performance Analysis of Scheduling Algorithms for WDM-PON Under SUCCESS_HPON Architecture", Journal of Light Wave Technology, vol. 23, NO X Month 2005].*
Assi ["Dynamic bandwidth Allocation for Quality of Service Over Ethernet PONs", Journal on Selected Areas in Communication, vol. 21 No. 9, Nov. 2003].*

(Continued)

*Primary Examiner*—Kenneth N Vanderpuye
*Assistant Examiner*—Oommen Jacob
(74) *Attorney, Agent, or Firm*—Ladas & Parry LLP (57) ABSTRACT

Provided are extendable loop-back passive optical network (PON) and scheduling method and apparatus for the same. The loop-back type PON includes an OLT (optical line terminal) including a wavelength-tunable optical transmitter and a wavelength-locked optical receiver, and an RN (remote node) including an optical coupler/splitter, the optical coupler/splitter receiving optical signals from the wavelength-tunable optical transmitter and splitting the optical signals by wavelength so as to transmit the optical signals to corresponding ONTs (optical network terminals). Each of the ONTs transmits upstream data to the OLT using the same wavelength as the wavelength of the optical signal received from the OLT through the RN. Since the optical network makes use of the TDM and WDM communication schemes, the optical network can be maintained and upgraded at lower cost.

5 Claims, 7 Drawing Sheets

OTHER PUBLICATIONS

Kramer ["Interleaved Polling with Adaptive Cycle Time (IPACT): A Dynamic Bandwidth Distribution Scheme in an Optical Access Network" Photonic Network Communication 4:1 89-107, 2002].*

Kim ["Design and Performance Analysis of Scheduling Algorithms for WDM-PON Under SUCCESS_HPON Architecture", Journal of Light Wave Technology, vol. 23, NO X Month 2005].*

Assi ["Dynamic bandwidth Allocation for Quality of Service Over Ethernet PONs", Journal on Selected Areas in Communication, vol. 21 No. 9, Nov. 2003].*

Kim ["Design and Performance Analysis of Scheduling Algorithms for WDM-PON under SUCCESS-HPON Architecture" Journal of Lightwave Technology vol. 23 No. X, 2005].*

Assi ["Dynamic Bandwidth Allocation for Quality-of-Service over Ethernet PONS" IEEE Journal on Selected Areas in Communications vol. 21 No. 9, Nov. 2003].*

Kramer ["Interleaved Polling with Adaptive Cycle Time (IPACT): A Dynamic Bandwidth Distribution Scheme in an Optical Access Network" Photonic Network Communications 4:1, 89-107, 2002].*

Miyoshi ["D-CRED: Efficient Dynamic Bandwidth Allocation Algorithm in Ethernet Passive Optical Networks" SEI Technical Review No. 58, Jun. 2004, pp. 34-41.*

Kim, K., et al., "Design and Performance Analysis of Scheduling Algorithms for WDM-PON under SUCCESS-HPON Architecture." 2005. *Journal of Lightwave Technology*, vol. 23, No. X, pp. 1-15.

* cited by examiner

■ GATE
▨ DOWNSTREAM DATA
▨ UPSTREAM DATA

EXTENDABLE LOOP-BACK TYPE PASSIVE OPTICAL NETWORK AND SCHEDULING METHOD AND APPARATUS FOR THE SAME

CROSS-REFERENCE TO RELATED PATENT APPLICATION

This application claims the benefit of Korean Patent Application No. 10-2005-0119992, filed on Dec. 8, 2005, Korean Patent Application No. 10-2006-0121814, filed on Dec. 4, 2006, in the Korean Intellectual Property Office, the disclosure of which is incorporated herein in its entirety by reference.

BACKGROUND OF THE INVENTION

1. Field of the Invention

The present invention relates to optical communication, and more particularly, to an extendable loop-back passive optical network (PON) in which network components can be added at lower cost.

2. Description of the Related Art

Optical networks for Fiber To The Home (FTTH) services can be classified into an active optical network (AON) and a passive optical network (PON). An AON includes an active device to manage services for subscribers. The active device performs switching or subscriber management at a remote node (RN). The AON is divided into a first section between a service provider and an RN and a second section between the RN and subscriber devices. The AON is used for a Fiber To The Pole (FTTP) service or a Fiber To The Curb (FTTC) service and accommodates a number of subscribers using a multiplexing communication scheme. However, the AON has a disadvantage in that the RN of the AON requires management and a power supply.

A PON is widely used for FTTH services and includes a passive device at an RN for connecting a service provider with optical network terminals (ONTs) within a single network section. Since the PON uses a passive device, additional management and the power supply are not required for managing optical devices. Furthermore, the PON can provide high-speed data services over a relatively large service area.

Examples of the PON include an Ethernet-passive optical network (E-PON) using a time division multiplexing (TDM) communication scheme. The E-PON is an Ethernet based PON used for point-to-multipoint connections, and Institute of Electrical and Electronics Engineers (IEEE) 802.3ah provides complete standards for the E-PON. In the E-PON, a passive splitter of an RN splits an optical core of a service provider so as to distribute the optical core to subscribers, and a passive optical coupler of the RN couples optical cores of subscribers together so as to transmit data from the optical cores of the subscribers to the optical core of the service provider. Therefore, downstream data from the service provider are naturally broadcasted, and a layer 2 of a subscriber node receives its own data selectively from the downstream data by filtering. On the other hand, upstream data from a plurality of subscribers can interfere with each other while the upstream data are coupled at the RN. Thus, transmission timing of upstream data is reported to ONTs so as to prevent the upstream data interference.

In another type of the PON called wavelength division multiplexing-passive optical network (WDM-PON), the wavelength of an optical source is used. In the WDM-PON, a plurality of wavelengths are multiplexed. The WDM-PON can provide a sufficient bandwidth for high quality of services (QoS) by assigning a wavelength to respective subscribers. In the WDM-PON, an optical core of a service provider transmits wavelengths after multiplexing the wavelengths, and an RN receives the multiplexed wavelengths from the optical core of the service provider and demultiplexes the received wavelengths. The demultiplexed wavelengths are delivered to respective subscribers. Upstream data are multiplexed by the RN and transmitted to the service provider, and the service provider demultiplexes the received upstream data. Unlike in the TDM-PON, upstream data from ONTs (subscribers) do not interfere with each other in the WDM-PON. Thus, upstream data can be transmitted at a desired time. However, the WDM-PON is expensive to construct.

The TDM-PON can be efficiently used for point-to-multipoint networking owing to statistic multiplexing of the TDM communication scheme. However, as subscribers demand more bandwidths, the number of subscriber lines connected to an optical core can be reduced from 32 to 8 or less. Moreover, in the extreme case where each subscriber requires a 1-Gbps bandwidth or larger, only one subscriber can be connected to an optical core. To address these problems, optical link speed can be increased by upgrading the TDM-PON. However, in this case, considerable costs are required. That is, all the OLT, ONTs, and RN of the TDM-PON should be replaced to increase an optical link speed of the TDM-PON. Therefore, it is disadvantageous for network evolution.

There is practically no limit to a subscriber bandwidth in the WDM-PON owing to the characteristics of the WDM communication scheme. That is, a 1-Gbps bandwidth can be provided in the WDM-PON without an addition device. However, since the WDM-PON has a static structure, network resources of the WDM-PON are wasted in the current network environment where subscribers do not require a large bandwidth. Furthermore, it is expected that 1-Gbps services are not required for subscribers in the next several years. Accordingly, the TDM-PON is disadvantageous since it is difficult to evolve (upgrade) the TDM-PON, and the WDM-PON is not suitable for the current networking environment.

Therefore, there is a need for an optical network that can efficiently accommodate increasing subscribers without wasting network resources.

SUMMARY OF THE INVENTION

The present invention provides an optical network having a structure for current middle bandwidth services and future modification and extension.

The present invention also provides an optical network that can be maintained and upgraded at lower cost by using advantages of time division multiplexing (TDM) and wavelength division multiplexing (WDM) communication schemes.

The present invention further provides a method of and apparatus for scheduling transmission of upstream and downstream data in a loop-back type passive optical network (PON).

According to an aspect of the present invention, there is provided a loop-back type PON including: an OLT (optical line terminal) including a wavelength-tunable optical transmitter and a wavelength-locked optical receiver; and an RN (remote node) including an optical coupler/splitter, the optical coupler/splitter receiving optical signals from the wavelength-tunable optical transmitter and splitting the optical signals by wavelength, and passively splitting again the split optical signals so as to transmit the optical signals to corresponding ONTs (optical network terminals), wherein each of the ONTs transmits upstream data to the OLT using the same wavelength as the wavelength of the optical signal received from the OLT through the RN.

The OLT may further include: a WDM coupler multiplexing optical signals from one or more wavelength-tunable optical transmitters of the OLT using a WDM scheme and transmitting the multiplexed optical signals to the RN; and a WDM demultiplexer demultiplexing optical signals received from the RN using a WDM scheme and transmitting the demultiplexed optical signals to the wavelength-locked optical receiver.

The OLT may further comprise a scheduler multiplexing the optical signals by a TDM (time division multiplexing) scheme based on the occupancy of downstream buffers for data transmission from the OLT to the ONTs and the occupancy of upstream buffers for data transmission from the ONTs to the OLT.

The number of the downstream buffers may be equal to the number of available wavelengths, and the number of the upstream buffers may be equal to or larger than the number of the downstream buffers.

According to another aspect of the present invention, there is provided a scheduling apparatus for a PON including an OLT and ONTs, the OLT having a wavelength-tunable optical transmitter and a wavelength-locked optical receiver, the scheduling apparatus including a scheduler multiplexing optical signals based on the occupancy of downstream buffers for data transmission from the OLT to the ONTs and the occupancy of upstream buffers for data transmission from the ONTs to the OLT.

The scheduler may scan the occupancy of the downstream buffers and the occupancy of the upstream buffers, calculate wavelength transmission times of wavelengths based on the occupancies of the downstream and upstream buffers, prepare a wavelength list for the wavelength-tunable optical transmitter so as to prevent the sum of the wavelength transmission times of the wavelengths from exceeding a predetermined time window, determine wavelength change timing for the wavelength-tunable optical transmitter using the wavelength list, and determine a transmission timing of a gate message in the wavelength transmission time of each wavelength for synchronizing the ONT with the OLT.

The scheduler may determine downstream and upstream transmission times for the optical signals based on the occupancy of the downstream buffers, the occupancy of the upstream buffers, the occupancy of ONTs receiving the same wavelength, and an RTT (round trim time) of the ONT, and determine the larger one of the downstream and upstream transmission times as the wavelength transmission time of a wavelength.

According to a further another aspect of the present invention, there is provided a scheduling method of a PON including an OLT and an ONT, the OLT including a wavelength-tunable optical transmitter and a wavelength-locked optical receiver, the ONT transmitting upstream data to the OLT using the same wavelength as that of an optical signal received from the OLT, the scheduling method including multiplexing the optical signal by a TDM scheme based on the occupancy of downstream buffers for data transmission from the OLT to the ONT and the occupancy of upstream buffers for data transmission from the ONT to the OLT.

The multiplexing of the optical signal may include: scanning the occupancy of the downstream buffers and the occupancy of the upstream buffers; calculating wavelength transmission times of wavelengths based on the occupancies of the downstream and upstream buffers; preparing a wavelength list for the wavelength-tunable optical transmitter so as to prevent the sum of the wavelength transmission times of the wavelengths from exceeding a predetermined time window; determining wavelength change timing for the wavelength-tunable optical transmitter using the wavelength list; and determining a transmission timing of a gate message in the wavelength transmission time of each wavelength for synchronizing the ONT with the OLT.

The determining of the wavelength change timing may include determining start and end points of the wavelength transmission time based on the wavelength transmission time and the wavelength list.

The determining of the transmission timing of the gate message may include determining the transmission timing of the gate message based on an RTT of the ONT and the occupancy of the upstream buffers.

According to the present invention, there is provided an optical network that can be maintained and upgraded at lower cost.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Figure 1:
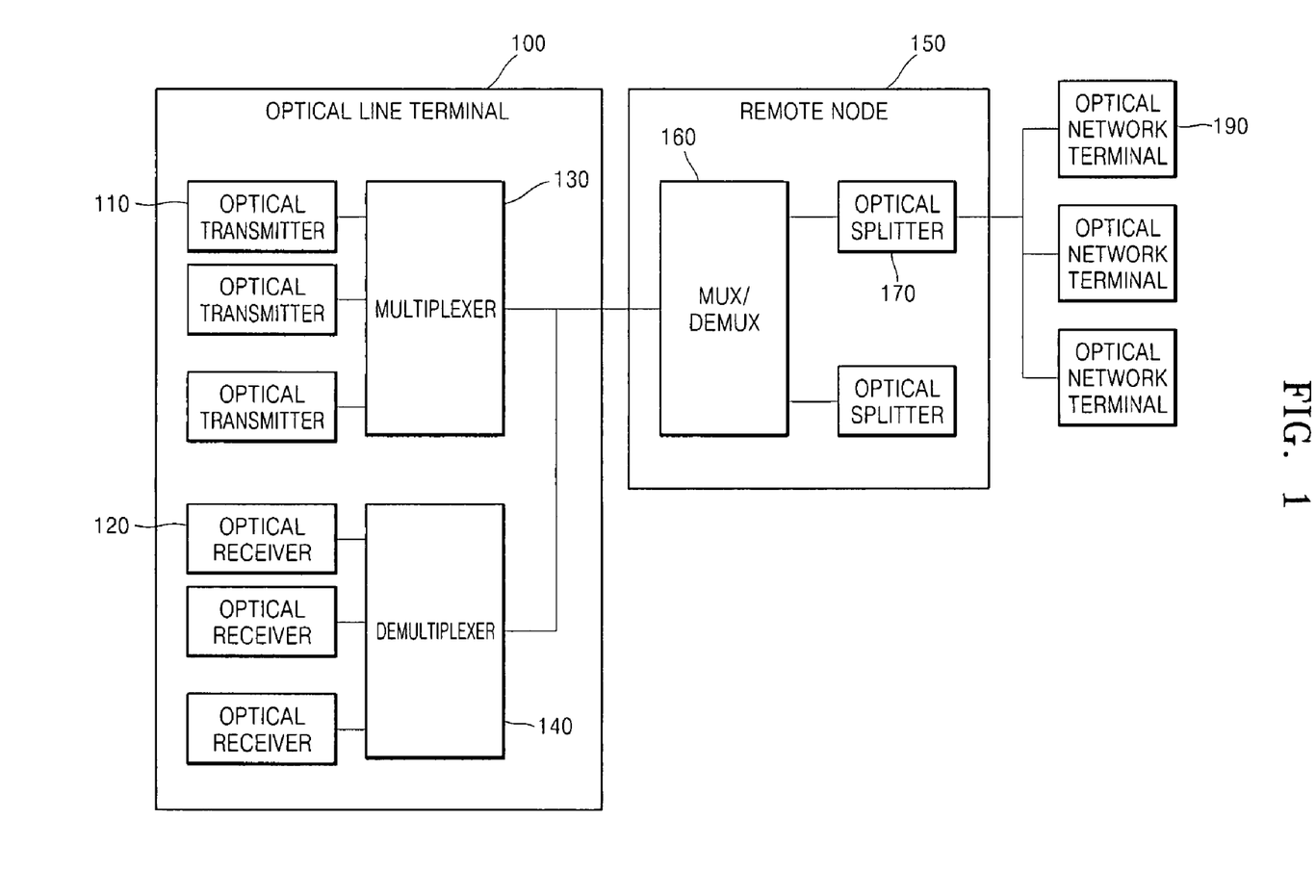
FIG. 1 is a schematic diagram illustrating a passive optical network (PON) according to an embodiment of the present invention.

FIG. 1 is a schematic diagram illustrating a passive optical network (PON) according to an embodiment of the present invention.

Referring to FIG. 1, the PON may have a wavelength division multiplexing-passive optical network (WDM-PON) structure with a time division multiplexing (TDM) function. That is, in the PON, an optical line terminal (OLT) 100 is connected to a remote node (RN) 150 by a WDM scheme, and the RN 150 is connected to optical network terminals (ONTs) 190 through an optical splitter 170.

Signals transmitted from a plurality of optical transmitters 110 are multiplexed by a multiplexer 130 using a WDM scheme. The PON of FIG. 1 can have a high optical-link efficiency since an optical link receives multiplexed wavelengths. Furthermore, the PON can perform statistical multiplexing using a TDM scheme. However, the number of optical transmitters 110 included in the OLT 100 should be equal to the number of available wavelengths since each of the optical transmitters 110 generates only a fixed-wavelength optical signal. Signals from the ONTs 190 are transmitted to corresponding optical receivers 120 through a demultiplexer 140 of the OLT 100.

Multiplexed wavelengths at the OLT 100 are demultiplexed by a MUX/DEMUX (MUX/DMUX) 160 of the RN 150, and then are split to the ONTs 190 by the splitter 170. The ONTs 190 are dependent on the optical transmitters 110 of the OLT 100. Therefore, even when one of the optical transmitters 110 malfunctions, services cannot be provided for all ONTs 190 associated with a wavelength generated by the malfunctioning optical transmitter 110.

Furthermore, since the number of the optical transmitters 110 of the OLT 100 is equal to the number of available wavelengths, although an optical-link service bandwidth is sufficiently large, optical-link efficiency can be decreased. For example, when a group (A) of ONTs 190 using a wavelength (A) does not operates and another group (B) of ONTs 190 using a different wavelength (B) requests high-bandwidth services, the wavelength (B) can be insufficient for providing the requested high-bandwidth services to the group (B). However, in this case, the requested high-bandwidth services cannot be provided to the group (B) using an optical source emitting the wavelength (A).

Figure 2:
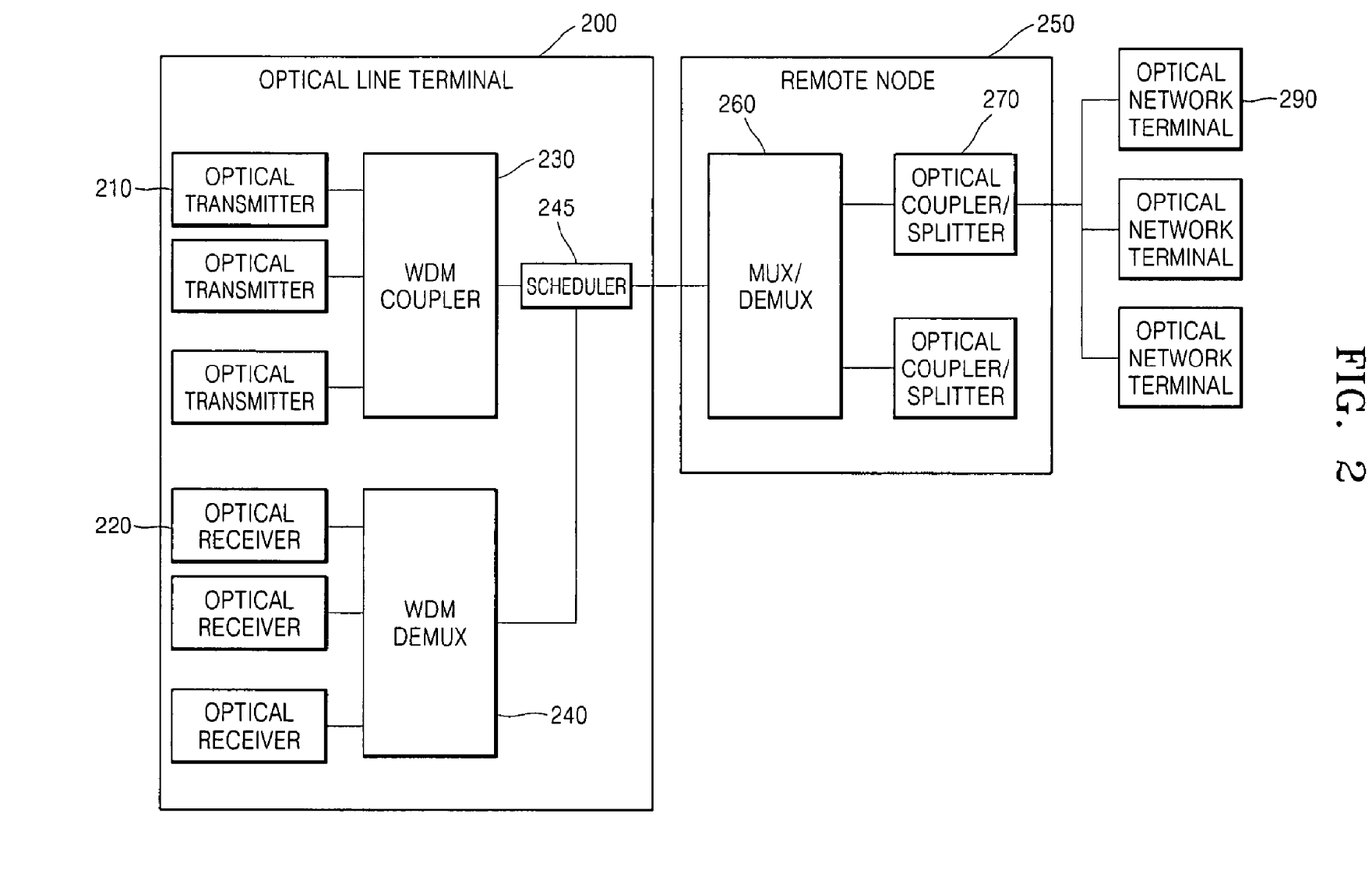
FIG. 2 is a schematic diagram illustrating a loop-back type PON according to an embodiment of the present invention.

FIG. 2 is a schematic diagram illustrating a loop-back type PON according to an embodiment of the present invention.

Since ONTs 290 illustrated in FIG. 2 are not dedicated to a particular wavelength, the ONTs 290 can transmit or receive data using other wavelengths even when a particular wavelength is not available. That is, an OLT 200 can transmit optical signals over the full range of available wavelengths using only one wavelength-tunable optical transmitter 210.

Furthermore, in the loop-back type PON of FIG. 2, the OLT 200 can use various wavelengths using only one wavelength-tunable optical transmitter 210. Therefore, optical network services can be provided for the ONTs 290 over the full range of available wavelengths using fewer wavelength-tunable optical transmitters 210.

Referring to FIG. 2, the OLT 200 includes one or more wavelength-tunable optical transmitters 210. A WDM coupler 230 is optionally included in the OLT 200 according to a network configuration. That is, the number of wavelength-tunable optical transmitters 210 included in the OLT 200 is determined by upstream and downstream service bandwidths for the ONTs 290. When only one wavelength-tunable optical transmitter 210 is included in the OLT 200, the WDM coupler 230 is not necessary. However, when two or more wavelength-tunable optical transmitters 210 are included in the OLT 200, the WDM coupler 230 is included in the OLT 200 so as to multiplex optical signals having different wavelengths for downlink transmission to the ONTs 290.

Unlike the wavelength-tunable optical transmitters 210, optical receivers 220 of the OLT 200 are dedicated to particular wavelengths, respectively. Thus, the optical receivers 220 receive corresponding wavelengths from a WDM DEMUX 240, respectively. The structure and operation of the WDM DEMUX 240 are similar to those of an optical coupler/splitter 270 of an RN 250.

Like the optical receivers 220 of the OLT 200, the RN 250 has a fixed-wavelength configuration. The RN 250 includes the optical coupler/splitter 270 and a MUX/DEMUX 260 so as to split and couple wavelengths.

Since the ONTs 290 are not dedicated to a particular wavelength, the RN 250 and the ONTs 290 can be upgraded without additional costs, thereby improving network extensibility. When the ONTs 290 are dedicated to particular wavelengths, the ONTs 290 should be properly arranged according to the wavelength bandwidth of the RN 250, and thus optical modules for the ONTs 290 should be manufactured in consideration of operating wavelengths of the ONTs 290. This complicates the manufacturing process of the optical modules and thus decreases productivity. For this reason, according to the present invention, loop-back optical modules not dedicated to a particular wavelength are used. According to a loop-back optical communication scheme, when downstream data are received from the wavelength-tunable optical transmitter 210 of the OLT 100, upstream data are transmitted using the same optical source as an optical source used for transmitting the downstream data.

When the number of current wavelength-tunable optical transmitters is insufficient for satisfying increasing demand for fiber to the home (FTTH) services, the optical network may be upgraded. According to an extendable WDM/TDM-PON structure of the present invention, an optical network can be upgraded at lower cost. That is, the loop-back type PON of the present invention can be easily upgraded by increasing the number of wavelength-tunable optical transmitters 210 of the OLT 200 and the number of WDM couplers 230 depending on the increased number of the wavelength-tunable optical transmitters 210. The loop-back type PON can be upgraded, modified, and extended without changing the structures of the RN 250 and the WDM DEMUX 240 since the ONTs 290 operate by the loop-back optical communication scheme.

The OLT 200 includes a scheduler 245 that multiplexes optical signals by a TDM scheme based on the occupancy of downstream buffers used for downstream data from the OLT 200 to the ONTs 290 and the occupancy of upstream buffers used for upstream data from the ONTs 290 to the OLT 200. The structure and operation of the scheduler 245 will now be described in detail with reference to FIGS. 3 and 4.

Figure 3:
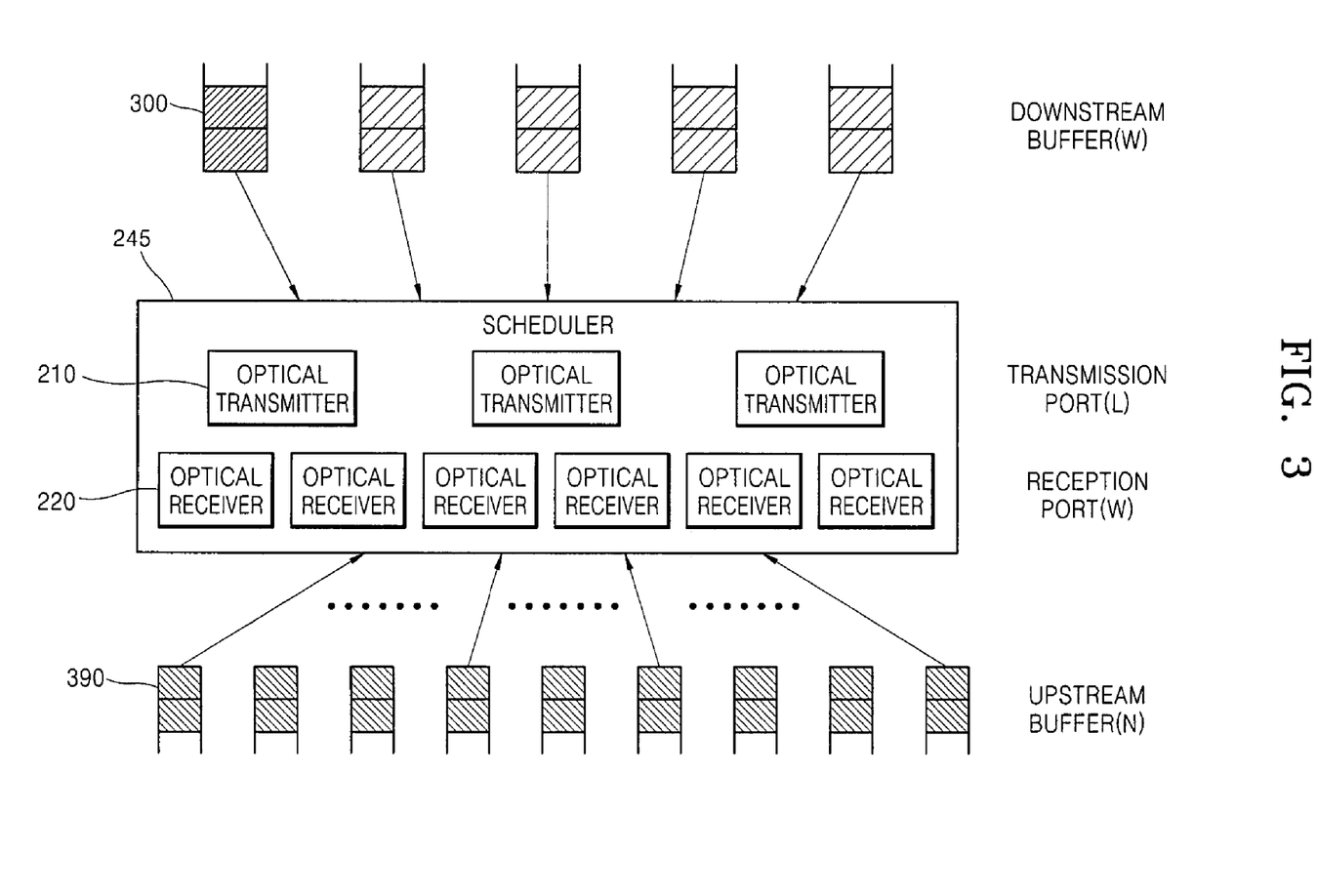
FIG. 3 is a diagram for explaining an operation of a scheduling apparatus according to an embodiment of the present invention.

FIG. 3 is a diagram for explaining an operation of a scheduling apparatus according to an embodiment of the present invention.

An OLT includes a plurality of wavelength-tunable optical transmitters 210 and a plurality of optical receivers 220. It is assumed that the number of wavelength-tunable optical transmitters 210 is L, and the number of optical receivers 220 is W. W is equal to the number of available wavelengths and the number of downstream buffers 300. However, since a wavelength can be divided into a plurality of wavelengths, N (the number of ONTs or the number of upstream buffers 390) is equal to or larger than W. That is, $L \leq W \leq N$.

Since both WDM and TDM communication schemes are used in the present invention, the configuration of FIG. 3 can be obtained. That is, the number of the optical receivers 220 included in the OLT corresponds to the number of available wavelengths, and the optical receivers 220 may be designed using the same specification as that of a wavelength splitter/coupler of an RN.

Owing to the W optical receivers 220, W wavelengths can be assigned to the separate downstream buffers 300, respectively. A destination address can be obtained by learning the Ethernet MAC (media access control) address of a datalink (layer 2) from data received through a reception port. Since the W optical receivers 220 receive (obtain) different ONT addresses, the OLT can acquire the addresses of the ONTs with respect to wavelengths. That is, since output ports for respective frames are determined with respective to addresses acquired from downstream data, one output buffer is allocated to one output port when the OLT has W output ports.

However, the number of the output ports is not limited to W. In the WDM-PON of the present invention, all available wavelengths are not always used. The number of wavelengths in use can be decreased or increased within the maximum number of available wavelengths. That is, W wavelengths can be used with fewer L wavelength-tunable optical transmitters 210 (i.e., L≦W). When downstream dada are transmitted for a predetermined time period via a particular wavelength among W wavelengths using the wavelength-tunable optical transmitter 210, the ONT transmits upstream data using the same wavelength as the wavelength received. This loop-back communication scheme allows the OLT to communicate with all ONTs in the full range of available wavelengths through an RN by only using L wavelength-tunable optical transmitters 210 and W optical receivers 220.

As explained above, the ONTs transmit upstream data on the same wavelength as the wavelength received from the OLT by using an upstream optical source. The RN according to the present invention has a two-step structure. That is, in the RN, a wavelength splitter divides downstream data from the OLT by wavelengths, and a manual optical splitter secondly divides the downstream data. Therefore, when the manual optical splitter divides one wavelength into S wavelengths, the maximum of N is W×S (where N is the number of ONTs, and W is the number of available wavelengths).

The scheduler 245 operates as follows. The scheduler 245 of the WDM/TDM-PON scans the occupancy of downstream buffers and the occupancy of upstream buffers of the ONTs. The downstream buffers are buffers for downstream data from a switch or bridge to subscribers (ONTs), and the upstream buffers are buffers for upstream data transmitted in the reverse direction of the downstream data. The scheduler 245 may select an optimal scheduling method based on the occupancies of the downstream and upstream buffers and the distances to the ONTs arranged by wavelengths. The scheduling method of the scheduler 245 will now be described in detail with reference to FIG. 4.

Figure 4:
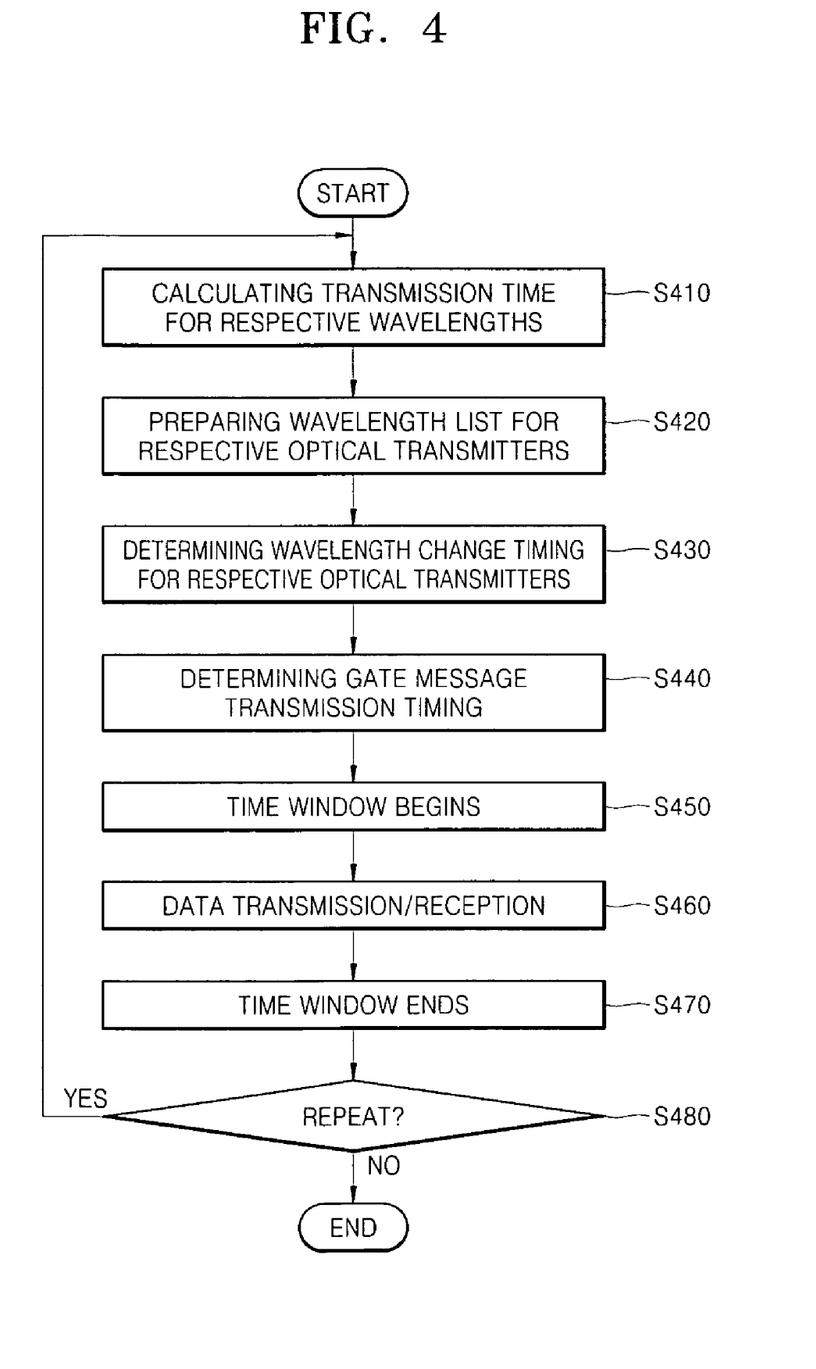
FIG. 4 is a flowchart for explaining a scheduling method according to an embodiment of the present invention.

FIG. 4 is a flowchart for explaining a scheduling method according to an embodiment of the present invention.

In operation S410, transmission times (Ti) are calculated with respect to wavelengths based on the numbers of upstream and downstream buffers at a given time window. The transmission time (Ti) means a time interval during which data are transmitted. After that, wavelengths to be used by each wavelength-tunable optical transmitter are listed in consideration of a time window for each wavelength-tunable optical transmitter (a wavelength list is prepared) in operation S420. In the wavelength list, wavelengths to be used by the wavelength-tunable optical transmitters for data transmission are listed in a predetermined order.

In operation S430, wavelength change timing is determined so as to set start and end time points for transmission of each wavelength.

In this way, the wavelength list is prepared for all wavelength-tunable optical transmitters, and transmission times for respective wavelengths are determined. Then, in operation S440, gate message transmission timing is determined for respective ONTs in consideration of wavelengths of the ONTs. The gate message is a message for synchronizing the ONTs with an OLT at a given wavelength-based transmission time.

In operation S450, a time window starts. Then, in operation S460, data are transmitted between the OLT and ONTs based on the preset start and end time points. In detail, each wavelength-tunable optical transmitter use a first wavelength to transmit a gate message and downstream data to corresponding ONTs, and then the corresponding ONTs transmits upstream data using the same wavelength as the first wavelength. After that, the wavelength-tunable optical transmitter uses a second wavelength, and upstream and downstream data are transmitted in the same way. In operation S470, the time window ends. In operation S480, it is determined whether the scheduling is repeated. If so, the procedure goes to the first operation.

As illustrated in FIG. 4, according to the scheduling method of the present invention, wavelengths can be efficiently used, and thus optical links can be optimally used. Furthermore, unexpected accident can be easily handled using the wavelength-tunable transmitters, and the optical network of the present invention can be easily extended with fewer costs. Meanwhile, tunable laser diodes can be used as the wavelength-tunable optical transmitters.

Figure 5:
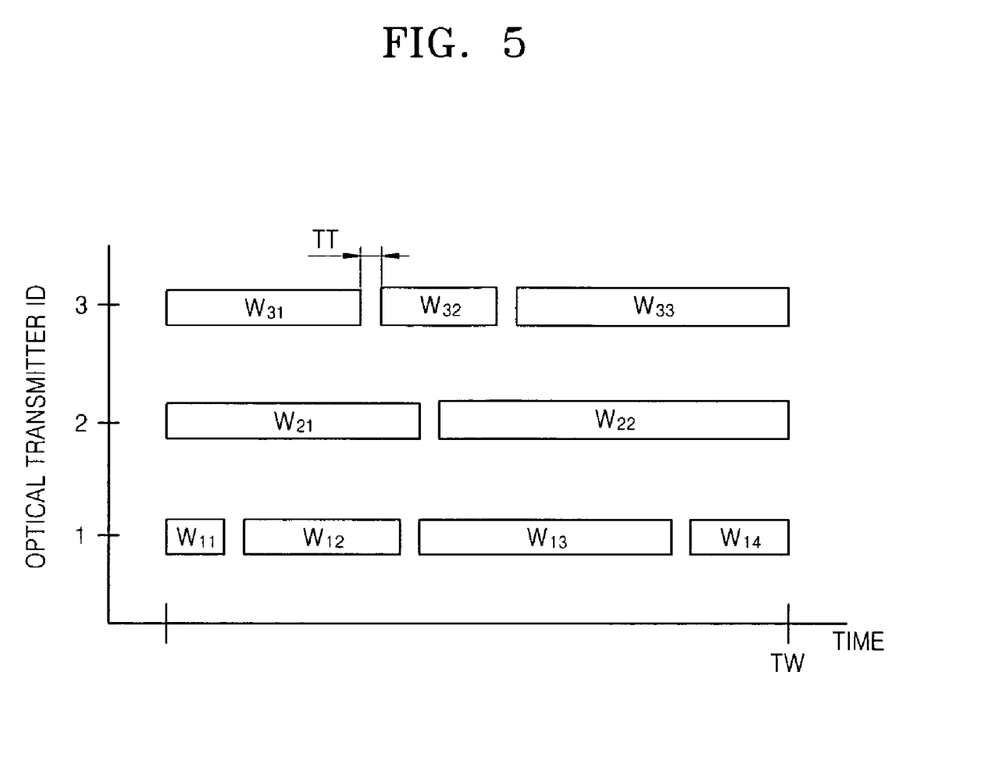
FIG. 5 is a diagram illustrating a time frame structure used for transmitting data in a PON according to an embodiment of the present invention.

FIG. 5 is a diagram illustrating a time frame structure used for transmitting data in a PON according to an embodiment of the present invention. In FIG. 5, the x-axis denotes time, and the y-axis denotes identifications (IDs) of wavelength-tunable optical transmitters.

Referring to FIG. 5, each of L wavelength-tunable optical transmitters (three are illustrated) transmits data using different wavelengths along the y-axis. $W_{ij}$ denotes a $j^{th}$ wavelength that an $i^{th}$ wavelength-tunable optical transmitter uses, and TT denotes a time necessary for the wavelength-tunable optical transmitter for changing wavelengths.

Different wavelength-tunable optical transmitters can transmit optical signals having different wavelengths at the same time. Therefore, service times of wavelengths are determined based on the number of wavelength-tunable optical transmitters, and each of the service times of the wavelengths are divided into sections for ONTs using the same wavelength. In other words, the time sections for ONTs using the same wavelength determine the service time of the wavelength, and in this way service times for all wavelengths are determined. Then, the wavelength bandwidths and wavelength changing times of the wavelength-tunable optical transmitters are determined based on the service times of the wavelengths.

A scheduler determines the following parameters.

Wavelengths for respective wavelength-tunable optical transmitters: $W_{ij}$

Start and end points of a wavelength changing time of each wavelength-tunable optical transmitter: $S(W_{jk})$, $E(W_{jk})$ Transmission start and end points of a gate message: S(njkm), E(njkm)

In a conventional top-down scheduling method, transmission wavelengths of wavelength-tunable optical transmitters are first determined, and accordingly start and end points of a wavelength changing time of each wavelength-tunable optical transmitter and the transmission time of a gate message are determined. However, since the present invention makes use of a wavelength changing communication scheme and a loop-back communication scheme, a bottom-up scheduling method may be used. That is, the transmission time of a gate message may be determined based on the upstream buffers of ONTs, wavelength change timing may be determined according to the determined transmission timing of the gate message, and wavelengths to be transmitted may be determined according to the determined wavelength change timing.

The transmission wavelength of a wavelength-tunable optical transmitter is selected from preset W wavelengths (here, W is the number wavelengths). Further, it is determined depending on the occupancies of transmission and reception buffers whether which of the wavelength-tunable optical transmitters changes its current wavelength to which of the W wavelengths. A wavelength transmission time means a time during which an OLT transmits a particular wavelength. The wavelength transmission time is determined by the occupancies of downstream and upstream buffers and the round trip time (RTT) of the ONT. When the ONT transmits upstream data by interleave polling, the wavelength transmission time can be calculated using Equation 1 below.

$$Ti = MAX(DT(i), UT(i)) \quad \text{[Equation 1]}$$

where Ti denotes a wavelength transmission time during which an $i^{th}$ wavelength among the W wavelengths is transmitted. In the present invention using loop-back ONTs, Ti is the larger one of DT(i) and UT(i), where DT(i) denotes a time for transmitting downstream data using the $i^{th}$ wavelength, and UT(i) denotes a time for receiving upstream data from n ONTs using the $i^{th}$ wavelength. Since the loop-back communication scheme is used, the Ti is the larger one of DT(i) and UT(i).

DT(i) and UT(i) can be calculated using Equation 2 below. In Equation 2, line rate denotes the transmission rate of a transmission line.

$$DT(i) = (i^{th}\text{ downstream buffer} + \text{number of ONTs }(i)\text{*GATE})/\text{Line Rate} + \text{Max\_RTT}(i)/2$$

$$UT(i) = (i^{th}\text{ upstream buffer} + \text{number of ONTs }(i)\text{*REPORT})/\text{Line Rate} + \text{Max\_RTT}(i) \quad \text{[Equation 2]}$$

Time periods for transmitting wavelengths using a wavelength-tunable optical transmitter can be expressed by a combination of wavelength transmission times Ti. Here, the combination of wavelength transmission times Ti for a given wavelength-tunable optical transmitter may be determined such that the sum of the wavelength transmission times Ti for the given wavelength-tunable optical transmitter does not exceed a periodic time window TW. The reason for this is that all ONTs communicating with the given wavelength-tunable optical transmitter should be visited once in one time window TW. That is, for example, a wavelength list for a $j^{th}$ wavelength-tunable optical transmitter may be (wj1, wj2, through to wjk). Here, j is the ID of the wavelength-tunable optical transmitter, and k denotes the number of wavelengths allocated to the $j^{th}$ wavelength-tunable optical transmitter. Therefore, $W_{jk}$ denotes a $k^{th}$ wavelength transmitted by the $j^{th}$ wavelength-tunable optical transmitter.

Start and end points for a transmission time of the $W_{jk}$ by the $j^{th}$ wavelength-tunable optical transmitter is determined by Equation 3.

$$Gs(j) = E(W_{jk})$$

$$S(W_{jk}) = Gs(j) + TT$$

$$E(W_{jk}) = S(W_{jk}) + T(W_{jk}) \quad \text{[Equation 3]}$$

where Gs(j) is the last scheduling end time point of the $j^{th}$ wavelength-tunable optical transmitter. For example, when a time window TW starts at a $1^{st}$ wavelength-tunable optical transmitter, Gs(1)=current time (i.e., Gs(1) is a start time point of the time window TW). Further, $S(W_{11})$=current time+TT (wavelength changing time). The end time point of $W_{11}$ is calculated by adding the wavelength transmission time $T(W_{11})$ to the start time point $S(W_{11})$. Then, Gs(1) is $E(W_{11})$. This scheduling is performed until transmission of the last wavelength $W_{1k}$ allocated to the $1^{st}$ wavelength-tunable optical transmitter is scheduled. In a given time window (TW), scheduling is completed in this way for the $1^{st}$ wavelength-tunable optical transmitter.

After start and end time points for transmitting each wavelength are determined in this way, upstream data synchronization is performed using a gate message. Thus, upstream and downstream data transmission can be possible using one wavelength. Then, information about upstream data is collected using a report message.

Gate message transmission timing for a particular ONT is determined by Equation 4 below.

$$S(njkm) = S(wjk) \quad (m=1)$$

$$S(njkm) = Es(jk) - RTT(njkm) \quad (m>1)$$

$$Es(j,k) = S(njkm) + RTT(njkm-1) + UB(j,k,m-1)/\text{Line\_Rate} \quad \text{[Equation 4]}$$

where S(njkm) denotes a start time point of a gate message for an $m^{th}$ ONT (n) communicating with a $j^{th}$ wavelength-tunable optical transmitter using a $k^{th}$ wavelength. In the case of a $1^{st}$ ONT, S(njkm) is equal to a start time point for transmission of a $k^{th}$ wavelength from the $j^{th}$ wavelength-tunable optical transmitter of an OLT. Then, in the case of the other ONTs, the start time point of a gate message from the OLT to a corresponding ONT is equal to a time point corresponding to a back of upstream data received from the previous ONT after a section corresponding to an RTT of the ONT is subtracted from the back of the upstream data.

UB(j,k,m−1) denotes the occupancy of upstream data bits received from the previous ONT, and a time value can be calculated by dividing UB(j,k,m−1) by Line_Rate. Therefore, Es(j,k) denotes a transmission end point of upstream data from the previous ONT including the RTT of the previous ONT, and a transmission start point of a gate message for the next ONT from the OLT can be calculated by subtracting the RTT of the corresponding ONT from the Es(j,k).

Figure 6:
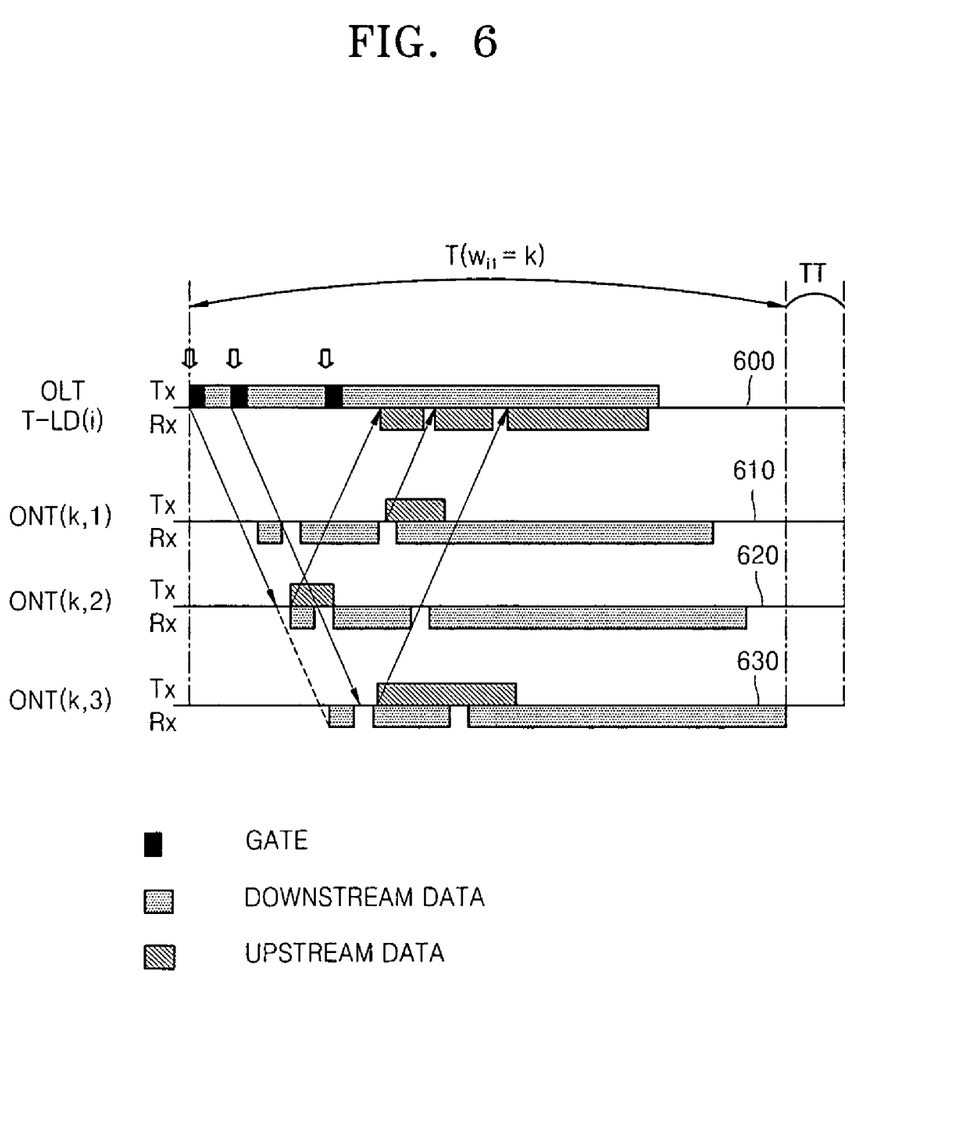
FIG. 6 is a diagram illustrating results of an scheduling operation according to an embodiment of the present invention.

FIG. 6 is a diagram illustrating results of a scheduling operation according to an embodiment of the present invention.

Referring to FIG. 6, transmission scheduling is illustrated for upstream and downstream data and a gate message between an $i^{th}$ wavelength-tunable optical transmitter of an ONT and three ONTs communicating with the $i^{th}$ wavelength-tunable optical transmitter using a first wavelength $W_{i1}$=k. The uppermost line 600 indicates transmission (Tx) data and reception (Rx) data of the $i^{th}$ wavelength-tunable optical transmitter of the OLT with respect to a time axis. The Tx data illustrated above the line 600 represents data transmitted from the $i^{th}$ wavelength-tunable optical transmitter of the OLT to corresponding ONTs, and the Rx data illustrated under the line 600 represents data received from the ONTs. Other three lines 610, 620, and 630 illustrate scheduling for Rx and Tx data of the ONTs. As shown in FIG. 6, when the $k^{th}$ wavelength is used, downstream data are broadcasted from the $i^{th}$ wavelength-tunable optical transmitter to all the three ONTs using the $k^{th}$ wavelength, and three gate messages are transmitted from the $i^{th}$ wavelength-tunable optical transmitter to the three ONTs, respectively, for upstream data from the ONTs to the $i^{th}$ wavelength-tunable optical transmitter.

Figure 7:
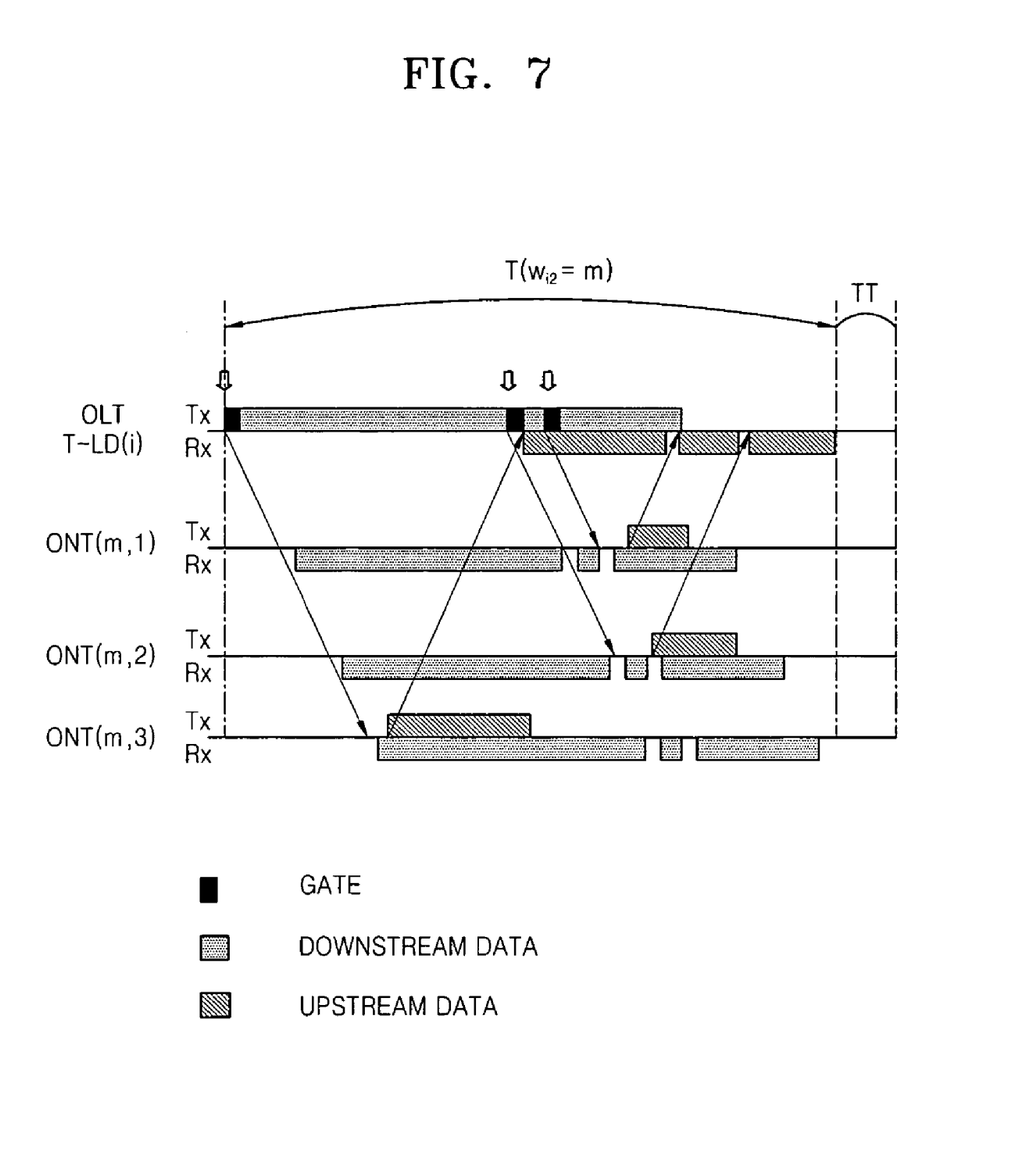
FIG. 7 is a diagram illustrating results of a scheduling operation according to another embodiment of the present invention.

FIG. 7 is a diagram illustrating results of a scheduling operation according to another embodiment of the present invention.

After the $W_{i1}$ wavelength is transmitted, the $i^{th}$ wavelength-tunable optical transmitter uses the next wavelength $W_{i2}$=m to transmit data to ONTs using the wavelength $W_{i2}$ in the same way as illustrated in the embodiment of FIG. 6. In the embodiment of FIG. 6, wavelength transmission is scheduled based on the downstream data since the occupancy of the downstream data is relatively high. However, in the current embodiment, wavelength transmission is scheduled based on the upstream data since the occupancy of the upstream data is relatively high.

In the scheduling method illustrated in FIG. 7, an OLT includes wavelength-tunable optical transmitters, and optical receivers and an RN are operated using fixed wavelengths. Therefore, the advantages of TDM and WDM communication schemes can be taken by efficiently operating the wavelength-tunable optical transmitters of the OLT. Furthermore, an optical network including an OLT, an RN, and ONTs can be easily extended by increasing the number of wavelength-tunable optical transmitters of the OLT and replacing a wavelength coupler according to the number of wavelength-tunable optical transmitters. That is, it is not required to modify the RN and ONTs for extending the optical network.

As described above, the optical network of the present invention has a structure suitable for current middle bandwidth services and future modification and extension.

Furthermore, since the optical network of the present invention makes use of the TDM and WDM communication schemes, the optical network of the present invention can be maintained and upgraded with fewer costs.

In addition, the present invention provides an apparatus for and method of scheduling transmission of upstream and downstream data in a loop-back PON.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scheduling method of a PON including an OLT and an ONT, the OLT including a wavelength-tunable optical transmitter and a wavelength-locked optical receiver, the ONT transmitting upstream data to the OLT using the same wavelength as that of an optical signal received from the OLT, the scheduling method comprising multiplexing the optical signal by a TDM scheme based on the occupancy of downstream buffers for data transmission from the OLT to the ONT and the occupancy of upstream buffers for data transmission from the ONT to the OLT such that the OLT is configured to schedule transmission of gate messages to corresponding ONTs to enable the corresponding ONTs to coordinate transmission timing of upstream data to the OLT by interleaving polling by estimating a maximum loop-back transmission time (Ti) needed for signal transmission at a given ith wavelength to correspond to a larger one of either a downstream transmission time (DT(i)) or an upstream transmission time (UT(i)) for signal transmission between the OLT and the ONTs that operate at the ith wavelength, wherein DT(i) is estimated by $$DT(i) = (DB(i) + GATE * \Sigma ONTs(i))/(\text{line Rate}(i)) + \max RTT\ (i)/2$$

where DB(i) is the ith downstream buffer, where $\Sigma$ ONTs(i) is the number of ONTs that operate at the ith wavelength, where GATE is the gate message transmission timelength, where line Rate(i) is the line Rate at the ith wavelength, and where max RTT(i) is a maximum roundtrip timelength at the ith wavelength, and wherein UT(i) is estimated by $$Ut(i) = (UB(i) + REPORT * \Sigma ONTs(i))/(\text{line Rate}(i)) + \max RTT\ (i)$$

where UB(i) is the ith downstream buffer, where $\Sigma$ ONTs(i) is the number of ONTs that operate at the ith wavelength, where REPORT is a report message transmission timelength, where line Rate(i) is the line Rate at the ith wavelength, and where max RTT(i) is the maximum roundtrip timelength at the ith wavelength.

2. The scheduling method of claim 1, wherein the multiplexing of the optical signal comprises:
scanning the occupancy of the downstream buffers and the number of the upstream buffers;
calculating wavelength transmission times of wavelengths based on the occupancies of the downstream and upstream buffers;
preparing a wavelength list for the wavelength-tunable optical transmitter so as to prevent the sum of the wavelength transmission times of the wavelengths from exceeding a predetermined time window;
determining wavelength change timing for the wavelength-tunable optical transmitter using the wavelength list; and
determining a transmission timing of a gate message in the wavelength transmission time of each wavelength for synchronizing the ONT with the OLT.

3. The scheduling method of claim 2, wherein the calculating of the wavelength transmission times comprises:
determining downstream and upstream transmission times for the optical signal based on the occupancy of the downstream buffers, the occupancy of the upstream buffers, the occupancy of ONTs receiving the same wavelength, and an RTT of the ONT;
determining the larger one of the downstream and upstream transmission times as the wavelength transmission time of a wavelength.

4. The scheduling method of claim 2, wherein the determining of the wavelength change timing comprises determining start and end points of the wavelength transmission time based on the wavelength transmission time and the wavelength list.

5. The scheduling method of claim 2, wherein the determining of the transmission timing of the gate message comprises determining the transmission timing of the gate message based on an RTT of the ONT and the occupancy of the upstream buffers.

* * * * *